United States Patent
Liang et al.

(10) Patent No.: US 11,219,217 B2
(45) Date of Patent: Jan. 11, 2022

(54) ORGANOSILICON ANTIMICROBIAL SOLUTION, ORGANOSILICON ANTIMICROBIAL AGENT, ANTIMICROBIAL GLASS, PREPARATION METHOD THEREFOR AND USE THEREOF

(71) Applicants: SHENZHEN CSG APPLIED TECHNOLOGY CO., LTD, Guangdong (CN); CSG HOLDING CO., LTD., Guangdong (CN)

(72) Inventors: Haichao Liang, Shenzhen (CN); Qi Wang, Shenzhen (CN)

(73) Assignee: SHENZHEN CSG APPLIED TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 16/762,943

(22) PCT Filed: Aug. 16, 2018

(86) PCT No.: PCT/CN2018/100844
§ 371 (c)(1),
(2) Date: May 11, 2020

(87) PCT Pub. No.: WO2019/105068
PCT Pub. Date: Jun. 6, 2019

(65) Prior Publication Data
US 2020/0329711 A1   Oct. 22, 2020

(30) Foreign Application Priority Data
Nov. 30, 2017   (CN) .......................... 201711234894.0

(51) Int. Cl.
*A01N 55/00*   (2006.01)
*A01N 33/12*   (2006.01)
(Continued)

(52) U.S. Cl.
CPC ............. *A01N 55/00* (2013.01); *A01N 25/34* (2013.01); *A01N 33/12* (2013.01); *A01N 55/04* (2013.01);
(Continued)

(58) Field of Classification Search
None
See application file for complete search history.

(56) References Cited

U.S. PATENT DOCUMENTS

| 5,439,993 A * | 8/1995 | Ito ............................. C08F 8/42 526/240 |
| 2004/0050297 A1* | 3/2004 | Kobayashi ........... C09D 183/04 106/287.14 |
| 2010/0275331 A1* | 10/2010 | Schwindt ............... A01N 43/16 800/298 |

FOREIGN PATENT DOCUMENTS

| CN | 101805205 A | 8/2010 |
| CN | 102030906 A | 4/2011 |

(Continued)

OTHER PUBLICATIONS

Machine-assisted English translation for EP 1 825 752 A1. (Year: 2007).*

*Primary Examiner* — Sin J Lee
(74) *Attorney, Agent, or Firm* — Kilpatrick Townsend & Stockton, LLP (57) ABSTRACT

An organosilicon antimicrobial solution, an organosilicon antimicrobial agent, an antimicrobial glass, a preparation method therefor, and use thereof. The organosilicon antimicrobial solution comprises, in percentage by mass: 30% to 65% of an organosilicon quaternary ammonium salt; 10% to 40% of ethyl orthosilicate; 10% to 40% of a double bond-containing organosilicon; 5% to 20% of an epoxy group-containing organosilicon; 5% to 20% of methyltrimethoxysilane; and 0.1% to 3% of an organotin catalyst. The (Continued)

organosilicon quaternary ammonium salt is selected from at least one of methyldiethoxysilane quaternary ammonium salt, N,N-dimethyl-N-octadecylaminopropyltrimethoxysilane quaternary ammonium salt, (trimethoxysilylpropyl)octadecyldimethylammonium chloride and 3-(trimethoxysilyl)propyldimethyldodecylammonium chloride. An antimicrobial glass prepared by the organosilicon antimicrobial solution above has strong versatility and small influence on the light transmittance of the glass.

5 Claims, 1 Drawing Sheet

(51) Int. Cl.
| | |
|---|---|
| *A01N 55/04* | (2006.01) |
| *A01N 25/34* | (2006.01) |
| *C03C 17/30* | (2006.01) |
| *C09D 5/14* | (2006.01) |
| *C09D 183/08* | (2006.01) |
| *C09D 183/06* | (2006.01) |
| *C08G 77/26* | (2006.01) |
| *C08G 77/14* | (2006.01) |
| *C08G 77/02* | (2006.01) |

(52) U.S. Cl.
CPC .............. *C03C 17/30* (2013.01); *C08G 77/02* (2013.01); *C08G 77/14* (2013.01); *C08G 77/26* (2013.01); *C09D 5/14* (2013.01); *C09D 183/06* (2013.01); *C09D 183/08* (2013.01); *C03C 2217/70* (2013.01); *C03C 2218/112* (2013.01); *C03C 2218/32* (2013.01)

(56) References Cited

FOREIGN PATENT DOCUMENTS

| | | | |
|---|---|---|---|
| CN | 102199396 A | 9/2011 | |
| CN | 104327721 A | 2/2015 | |
| CN | 106084234 A | 11/2016 | |
| CN | 106255727 A | 12/2016 | |
| CN | 107987722 A | 5/2018 | |
| EP | 1825752 A2 * | 8/2007 | ............ A01N 25/08 |
| JP | 2001049173 A | 2/2001 | |
| JP | 2002348535 A | 12/2002 | |

* cited by examiner

ORGANOSILICON ANTIMICROBIAL SOLUTION, ORGANOSILICON ANTIMICROBIAL AGENT, ANTIMICROBIAL GLASS, PREPARATION METHOD THEREFOR AND USE THEREOF

CROSS-REFERENCE TO RELATED APPLICATIONS

This application is the national phase of International Application No. PCT/CN2018/100844, filed on Aug. 16, 2018, which claims priority to the Chinese Application No. 201711234894.0, filed on Nov. 30, 2017, the entire content of which are incorporated herein in their entireties.

TECHNICAL FIELD

The present disclosure relates to a silicone bactericidal solution, a silicone bactericide, a bactericidal glass, a preparation method, and a use thereof.

BACKGROUND

Antibacterial technology has always been an effective means to resist the invasion of harmful bacteria into humans. The broad sense of antibacterial includes sterilization, degerming, antisepsis, disinfection, and other related effects of inhibiting bacteria. Antibacterial glass is a new type of material that combines microbiology and material science. It is called "green glass" because it is not harmful to the environment and human body. Antibacterial glass has a strong killing effect on molds such as *Candida albicans* and bacterial microorganisms such as *Escherichia coli, Pseudomonas aeruginosa, Staphylococcus aureus, Salmonella, Bacillus subtilis*, and the like, and does not produce drug resistance.

"Antibacterial glass" is a kind of functional glass newly researched and developed. It has added new functions of bacteriostasis and bactericidal on the basis of maintaining its original lighting, wind shielding, and rain protection. This increase in functionality not only improves and enhances our living environment, but also makes it possible to implement comprehensive antibacterial projects in industries such as medical treatment, health care, and home appliances. Antibacterial glass can be used wherever glasses can be used, such as in the medical industry, pharmaceutical industry, food industry, home appliance industry, schools, transportation, and other places.

Domestic and foreign patents and products related to antibacterial glass have already existed. For example, at the 2014 CES International Consumer Electronics Show, Corning launched a new "Antibacterial Gorilla Glass". This glass is a glass product obtained by incorporating a small amount of silver ions into a glass surface in a molten state of the glass. The glass has a certain antibacterial effect by slowly dissolving the silver ions out the glass solids. Since silver ions are easily discolored by air oxidation, the amount of silver ions incorporated is very small in order to ensure that the glass does not discolor. In addition, such silver antibacterial glass has antibacterial action due to the dissolution of silver ions. Therefore, silver ions will eventually dissolve out and eventually lose their antibacterial effect. This is why the "Antibacterial Gorilla Glass" has not been approved by the market.

In many current antibacterial glass patents, silver antibacterial glass and titanium antibacterial glass are mainly used. Among them, silver antibacterial glass uses ionized silver to embed silver ions into the surface layer of glass by high-temperature calcination, and then slowly releases silver ions through contact with air and water, which acts to inhibit the growth of bacteria. Titanium antibacterial glass is formed by introducing a photocatalytic antibacterial agent $TiO_2$ coating on the glass surface at a high temperature. While $TiO_2$ is a kind of semiconductor, it can be easily excited on the surface under the irradiation of ultraviolet light to produce hydroxyl radicals with strong oxidizing ability, which can quickly and effectively decompose the organic substances that constitute the bacteria and the organic nutrients that the bacteria depend on to survive, such that the bacterial proteins are mutated, thereby achieving the antibacterial effect.

Although silver antibacterial glass and titanium antibacterial glass have been developed in recent years, there are still many problems to be solved. For example, with respect to silver antibacterial glass, (1) silver antibacterial glass is generally obtained by embedding a certain amount of silver ions ($Ag^+$) on the glass surface in a molten state. Since the embedded $Ag^+$ is easily oxidized by air, the glass turns yellow or even brownish black, which seriously affects the appearance of the glass. In order to keep the glass from discoloration, the amount of $Ag^+$ incorporated must be very small. However, an excessively small amount of silver ions can only inhibit the bacteria and cannot really kill them. Therefore, silver antibacterial glass can only be called a "bacteriostatic glass". (2) Silver-carrying antibacterial glass has an ideal bactericidal effect in an initial stage, but the antibacterial effect may be drastically reduced at the later stage, and the antibacterial service life thereof is not long. In addition, with respect to $TiO_2$ antibacterial glass, it is necessary to rely on ultraviolet light irradiation to excite photocatalytic semiconductors to generate hydroxyl radicals on their surfaces, thereby achieving bactericidal action. However, ultraviolet light irradiation is not always available under actual application conditions, and ultraviolet light is also harmful to the human body. Therefore, $TiO_2$ antibacterial glass has some limitations in practical applications.

SUMMARY

Accordingly, it is necessary to provide a silicone bactericidal solution, a silicone bactericide, a bactericidal glass, a preparation method, and a use thereof, which have a strong versatility and less influence on the transparency of the glass.

A silicone bactericidal solution includes: by weight percentage, 30% to 65% of silicone quaternary ammonium salt, 10% to 40% of tetraethyl orthosilicate, 10% to 40% of silicone containing double bond, 5% to 20% of silicone containing epoxy group, 5% to 20% of methyltrimethoxysilane, and 0.1% to 3% of organic tin catalyst. The silicone quaternary ammonium salt is at least one selected from the group consisting of methyldiethoxysilane ammonium chloride, N,N-dimethyl-N-octadecylaminopropyltrimethoxysilane ammonium chloride, (trimethoxysilylpropyl)octadecyldimethyl ammonium chloride, and 3-(trimethoxysilyl)propyldimethyldodecyl ammonium chloride.

A silicone bactericide can be obtained by reacting the aforementioned silicone bactericidal solution at a low temperature. The silicone bactericide can be coated on a glass surface, and is then cured by baking to form a bactericidal film, which can sterilize effectively without irradiation using ultraviolet light and have a strong universality. The formed bactericidal film has less influence on the transparency of the glass (the decrease of transmittance is less than or equal to 3%), has no influence on the practical application and appearance of the glass, and the bactericidal film on the glass surface has a better wear resistance. By the selection and proportion of each component in the silicone bactericidal solution, and under high temperature catalysis, the bactericide can react with the active hydroxyl functional group on the glass surface to form chemical covalent bonds, thus resulting in a strong adhesion between the formed bactericidal film and the glass, which addresses the problem that the adhesion between the conventional quaternary ammonium salt bactericide and the fabric is weak and the conventional quaternary ammonium salt bactericide is easy to elute and therefore unsuitable for application to glass. As determined experimentally, the prepared bactericidal glass can maintain a long-acting bactericidal effect.

In one embodiment, the silicone containing double bond is at least one selected from the group consisting of vinyltrimethoxysilane and vinyltriethoxysilane.

In one embodiment, the silicone containing epoxy group is at least one selected from the group consisting of γ-(2,3-epoxypropoxy)propyltrimethoxysilane, 3-(2,3-epoxypropoxy)propyltriethoxysilane, and 3-(2,3-epoxypropoxy)propylmethyldiethoxysilane.

In one embodiment, the organic tin catalyst is at least one selected from the group consisting of dibutyltin diacetate, dibutyltin dilaurate, stannous octoate, and dibutylbis(dodecylthio)tin.

A silicone bactericide is further provided. The silicone bactericide is obtained by reacting the aforementioned silicone bactericidal solution at a temperature of 40° C. to 80° C. for 1 hour to 8 hours.

A method of preparing a bactericidal glass includes the following steps of: coating the aforementioned silicone bactericide on a glass surface; and performing a baking treatment to the silicone bactericide coated on the glass surface to cure the silicone bactericide, thus obtaining the bactericidal glass.

In one embodiment, a temperature of the baking treatment ranges from 260° C. to 300° C., a temperature of the baking treatment is 10 minutes to 15 minutes.

A bactericidal glass obtained by the aforementioned method of preparing the bactericidal glass is further provided.

A bactericidal glass includes a glass substrate and a bactericidal film formed on a surface of the glass substrate. The bactericidal film is formed from the aforementioned silicone bactericidal solution.

A use of the aforementioned bactericidal glass in a hollow glass, a low emissivity glass, or a laminated glass.

DETAILED DESCRIPTION OF THE EMBODIMENTS

A silicone bactericidal solution, a silicone bactericide, a bactericidal glass, a preparation method, and a use thereof will be further described in detail hereinafter with reference to the specific embodiments.

A silicone bactericidal solution according to an embodiment includes: by weight percentage,
  30% to 65% of silicone quaternary ammonium salt;
  10% to 40% of tetraethyl orthosilicate;
  10% to 40% of silicone containing double bond;
  5% to 20% of silicone containing epoxy group;
  5% to 20% of methyltrimethoxysilane; and
  0.1% to 3% of organic tin catalyst.

The silicone quaternary ammonium salt is at least one selected from the group consisting of methyldiethoxysilane ammonium chloride, N,N-dimethyl-N-octadecylaminopropyltrimethoxysilane ammonium chloride, (trimethoxysilylpropyl)octadecyldimethyl ammonium chloride, and 3-(trimethoxysilyl)propyldimethyldodecyl ammonium chloride.

In one embodiment, the silicone containing double bond is at least one selected from the group consisting of vinyltrimethoxysilane and vinyltriethoxysilane.

In one embodiment, the silicone containing epoxy group is at least one selected from the group consisting of γ-(2,3-epoxypropoxy)propyltrimethoxysilane, 3-(2,3-epoxypropoxy)propyltriethoxysilane, and 3-(2,3-epoxypropoxy)propylmethyldiethoxysilane.

In one embodiment, the organic tin catalyst is at least one selected from the group consisting of dibutyltin diacetate, dibutyltin dilaurate, stannous octoate, and dibutylbis(dodecylthio)tin.

In one embodiment, the silicone bactericidal solution includes: by weight percentage,
  50% to 55% of silicone quaternary ammonium salt;
  10% to 15% of tetraethyl orthosilicate;
  15% to 20% of silicone containing double bond;
  6% to 10% of silicone containing epoxy group;
  10% to 15% of methyltrimethoxysilane; and
  0.1% to 0.5% of organic tin catalyst.

A silicone bactericide can be obtained by reacting the aforementioned silicone bactericidal solution at a low temperature. The silicone bactericide can be coated on a glass surface, and is then cured by baking to form a bactericidal film, which can sterilize effectively without irradiation using ultraviolet light and have a strong universality. The formed bactericidal film has less effect on the transparency of the glass, and the bactericidal film on the glass surface has a better wear resistance. By the selection and proportion of each component in the silicone bactericidal solution, and under high temperature catalysis, the bactericide can react with the active hydroxyl functional group on the glass surface to form chemical covalent bonds, thus resulting in a strong adhesion between the formed bactericidal film and the glass, which addresses the problem that the adhesion between the conventional quaternary ammonium salt bactericide and the fabric is weak and the conventional quaternary ammonium salt bactericide is easy to elute. As determined experimentally, the prepared bactericidal glass can maintain a long-acting bactericidal effect. The aforementioned silicone bactericidal solution has an efficient bactericidal function, a good broad spectrum, a simple preparation process, safety, non-toxicity, and durable bactericidal effect. In addition, the aforementioned silicone bactericidal solution does not require to use high-cost metal ion antibacterial ingredients, and does not rely on the excitation of ultraviolet light to exhibit a bactericidal effect. The bactericidal glass formed by coating on the glass surface has high safety and good heat resistance (up to more than 300° C.).

A silicone bactericide according to an embodiment is obtained by reacting the aforementioned silicone bactericidal solution at a temperature of 40° C. to 80° C. for 1 hour to 8 hours.

The aforementioned silicone bactericidal solution is reacted at the temperature of 40° C. to 80° C. for 1 hour to 8 hours to perform polymerization, thereby obtaining a prepolymer, which can be coated on the glass surface to form a bactericide layer. In the present embodiment, the silicone bactericidal solution is directly reacted at the temperature of 40° C. to 80° C. without adding a solvent.

In one embodiment, the aforementioned silicone bactericidal solution is slowly added into a reaction kettle, gradually heated up under stirring, and maintained at a reaction temperature of 40° C. to 80° C. for 1 hour to 8 hours. And the silicone bactericide is obtained after cooling. Preferably, a heating rate is 55° C./min to 60° C./min.

The aforementioned silicone bactericide can be coated on the glass surface to form a uniform bactericide layer, which is not prone to have spraying problems such as orange peel, wavy pattern, spots, and the like, and is suitable for spraying. Therefore, a product without rainbow spots can be finally obtained, and the light transmittance of the glass is less affected.

A method of preparing the bactericidal glass according to an embodiment includes the following steps of:

In step S110, the aforementioned silicone bactericidal solution is reacted at a temperature of 40° C. to 80° C. for 1 hour to 8 hours to obtain a silicone bactericide.

In one embodiment, the aforementioned silicone bactericidal solution is slowly added into a reaction kettle, gradually heated up under stirring, and maintained at a reaction temperature of 40° C. to 80° C. for 1 hour to 8 hours. And then the silicone bactericide is obtained after cooling. Preferably, a heating rate is 55° C./min to 60° C./min.

The aforementioned silicone bactericidal solution is reacted at the temperature of 40° C. to 80° C. for 1 hour to 8 hours for polymerization, thereby obtaining a prepolymer, which can be coated on the glass surface.

It should be noted that the step S110 can be omitted. In this case, the silicone bactericide can be used directly.

In step S120, the silicone bactericide is coated on a glass surface.

In one embodiment, the glass is soda-lime glass or high alumina glass.

In one embodiment, the glass is untempered glass, tempered glass, or semi-tempered glass.

In one embodiment, the glass is a glass plate.

In one embodiment, the coating method is spray coating or roller coating. Of course, in alternative embodiments, other commonly used methods such as scrape coating can also be used as long as a coating can be formed on the glass surface.

In one embodiment, the glass surface is coated with the silicone bactericide to form a bactericide layer. The bactericide layer has a thickness of 0.1 μm to 100 μm, preferably 3 μm to 7 μm. In addition, when coating the silicone bactericide to form the bactericide layer, no orange peel, wave pattern, spots, or other spraying problems can occur.

In step S130, a baking treatment is performed to the silicone bactericide coated on the glass surface to cure the silicone bactericide, thus obtaining the bactericidal glass.

In one embodiment, a temperature of the baking treatment ranges from 260° C. to 300° C., a temperature of the baking treatment is 10 minutes to 15 minutes. Of course, the temperature and time for the baking treatment are not limited to the aforementioned time and temperature as long as the silicone bactericide can be reacted to cure.

In this step, under high temperature catalysis, the silicone bactericide can react with the active hydroxyl functional group on the glass surface to form chemical covalent bonds, such that the organosilicon polymer firmly adheres to the glass surface, thereby ensuring the long-acting bactericidal property of the bactericidal glass.

The aforementioned method of preparing the bactericidal glass has a simple process, the bactericidal film of the prepared bactericidal glass has a strong adhesion to the glass. As determined experimentally, the prepared bactericidal glass can maintain a long-acting bactericidal effect, and the transmission of light thereof is excellent.

A bactericidal glass according to an embodiment is obtained by the aforementioned method of preparing the bactericidal glass.

The aforementioned bactericidal glass has a better transmission of light and a strong universality. The formed bactericidal film has a strong adhesion to the glass, and the bactericidal glass has a long-acting bactericidal activity.

Figure 1:
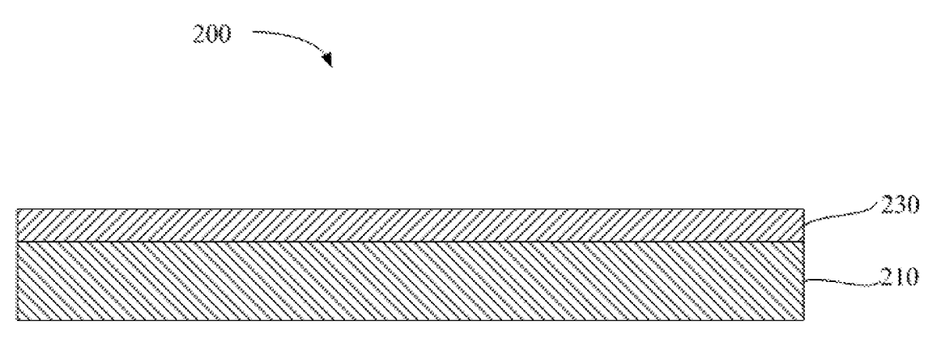
FIG. 1 is a schematic view of a bactericidal glass according to an embodiment.

Referring to FIG. 1, a bactericidal glass 200 according to another embodiment includes a glass substrate 210 and a bactericidal film 230.

In one embodiment, the glass substrate 210 is soda-lime glass or high alumina glass.

In one embodiment, the glass substrate 210 is untempered glass, tempered glass, or semi-tempered glass.

In one embodiment, the glass substrate 210 is a glass plate. Preferably, the glass substrate 210 has a thickness of 4 mm to 6 mm. Of course, it should be noted that, the glass substrate 210 is not limited to a plate shape, and it may be other shapes such as curved glass, as long as the bactericidal film 230 can be formed on a surface of the glass substrate 210.

In the illustrated embodiment, the bactericidal film 230 is formed on one surface of the glass substrate 210. Of course, it should be noted that, in alternative embodiments, the bactericidal film 230 can be formed on the other surfaces of the glass substrate 210.

The bactericidal film 230 is formed from the aforementioned silicone bactericidal solution. The aforementioned silicone bactericidal solution is prepared to form the silicone bactericide, and then the silicone bactericide is coated on the surface of the glass substrate 210 to be cured.

In one embodiment, the bactericidal film 230 has a thickness of 2 μm to 5 μm.

The aforementioned bactericidal glass has a better transmission of light and a strong universality. The bactericidal film has a strong adhesion to the glass and has a better wear resistance. When the bacteria are adsorbed on the surface of the bactericidal film 230, the bactericidal film 230 can invade the cell wall of the bacteria, destroys the cell membrane of the bacteria, and finally kills the bacteria. The bactericidal film has a long-acting bactericidal activity.

The aforementioned two bactericidal glasses can be used as various types of glass applications, such as hollow glass, low emissivity glass, or laminated glass.

Hereinafter, detailed description will be made with reference to specific examples.

The 1 #glass used in the following examples is a tempered soda-lime glass plate, which has a thickness of 6 mm. 2 #glass is a tempered high alumina glass plate, which has a thickness of 4 mm. 3 #glass is an untempered soda-lime glass plate, which has a thickness of 6 mm. 4 #glass is an untempered high-aluminum glass plate, which has a thickness of 4 mm.

EXAMPLE 1

A silicone bactericidal solution according to example 1 included:
  30% of methyldiethoxysilane ammonium chloride;
  10% of tetraethyl orthosilicate;
  17% of vinyltrimethoxysilane;
  20% of γ-(2,3-epoxypropoxy)propyltrimethoxysilane;
  20% of methyltrimethoxysilane; and
  3% of dibutyltin diacetate.

The aforementioned silicone bactericidal solution was added into a reaction kettle in three divided times, heated to a temperature of 40° C. under stirring at a heating rate of 5° C./min, and reacted for 8 hours to obtain a silicone bactericide.

The aforementioned silicone bactericide was uniformly coated on one surface of the 1 #glass by a spraying equipment to form a bactericide layer having a thickness of 0.1 μm. The bactericide layer could not exhibit appearance spraying problems such as orange peel, wave pattern, and spots.

The 1 #glass was baked at a temperature of 260° C. for 15 minutes to obtain a bactericidal glass.

EXAMPLE 2

A silicone bactericidal solution according to example 2 included:
65% of N,N-dimethyl-N-octadecylaminopropyltrimethoxysilane ammonium chloride;
10% of tetraethyl orthosilicate;
10% of vinyltriethoxysilane;
5% of 3-(2,3-epoxypropoxy)propyltriethoxysilane;
7% of methyltrimethoxysilane; and
3% of dibutyltin dilaurate.

The aforementioned silicone bactericidal solution was added into a reaction kettle in three divided times, heated to a temperature of 80° C. under stirring at a heating rate of 5° C./min, and reacted for 1 hour to obtain a silicone bactericide.

The aforementioned silicone bactericide was uniformly coated on one surface of the 2 #glass by a roller coating equipment to form a bactericide layer having a thickness of 10 μm. The bactericide layer could not exhibit appearance spraying problems such as orange peel, wave pattern, and spots.

The 2 #glass was baked at a temperature of 300° C. for 10 minutes to obtain a bactericidal glass.

EXAMPLE 3

A silicone bactericidal solution according to example 3 included:
30% of (trimethoxysilylpropyl)octadecyldimethyl ammonium chloride;
40% of tetraethyl orthosilicate;
19.9% of vinyltriethoxysilane;
5% of 3-(2,3-epoxypropoxy)propylmethyldiethoxysilane;
5% of methyltrimethoxysilane; and
0.1% of stannous octoate.

The aforementioned silicone bactericidal solution was added into a reaction kettle in three divided times, heated to a temperature of 60° C. under stirring at a heating rate of 5° C./min, and reacted for 5 hours to obtain a silicone bactericide.

The aforementioned silicone bactericide was uniformly coated on one surface of the 3 #glass by a roller coating equipment to form a bactericide layer having a thickness of 3 μm. The bactericide layer could not exhibit appearance spraying problems such as orange peel, wave pattern, and spots.

The 3 #glass was baked at a temperature of 280° C. for 12 minutes to obtain a bactericidal glass.

EXAMPLE 4

A silicone bactericidal solution according to example 4 included:
50% of (trimethoxysilylpropyl)octadecyldimethyl ammonium chloride;
20% of tetraethyl orthosilicate;
10% of vinyltrimethoxysilane;
10% of γ-(2,3-epoxypropoxy)propyltrimethoxysilane;
7% of methyltrimethoxysilane; and
3% of dibutylbis(dodecylthio)tin.

The aforementioned silicone bactericidal solution was added into a reaction kettle in three divided times, heated to a temperature of 50° C. under stirring at a heating rate of 5° C./min, and reacted for 7 hours to obtain a silicone bactericide.

The aforementioned silicone bactericide was uniformly coated on one surface of the 4 #glass by a roller coating equipment to form a bactericide layer having a thickness of 7 μm. The bactericide layer could not exhibit appearance spraying problems such as orange peel, wave pattern, and spots.

The 4 #glass was baked at a temperature of 270° C. for 13 minutes to obtain a bactericidal glass.

EXAMPLE 5

A silicone bactericidal solution according to example 5 included:
55% of 3-(trimethoxysilyl)propyldimethyldodecyl ammonium chloride;
15% of tetraethyl orthosilicate;
16% of vinyltriethoxysilane;
7% of 3-(2,3-epoxypropoxy)propyltriethoxysilane;
6% of methyltrimethoxysilane; and
1% of dibutyltin diacetate.

The aforementioned silicone bactericidal solution was added into a reaction kettle in three divided times, heated to a temperature of 60° C. under stirring at a heating rate of 5° C./min, and reacted for 5 hours to obtain a silicone bactericide.

The aforementioned silicone bactericide was uniformly coated on one surface of the 1 #glass by a roller coating equipment to form a bactericide layer having a thickness of 20 μm. The bactericide layer could not exhibit appearance spraying problems such as orange peel, wave pattern, and spots.

The 1 #glass was baked at a temperature of 270° C. for 13 minutes to obtain a bactericidal glass.

EXAMPLE 6

A silicone bactericidal solution according to example 6 included:
56% of 3-(trimethoxysilyl)propyldimethyldodecyl ammonium chloride;
13% of tetraethyl orthosilicate;
16% of vinyltrimethoxysilane;
8% of γ-(2,3-epoxypropoxy)propyltrimethoxysilane;
6% of methyltrimethoxysilane; and
1% of dibutylbis(dodecylthio)tin.

The aforementioned silicone bactericidal solution was added into a reaction kettle in three divided times, heated to a temperature of 50° C. under stirring at a heating rate of 5° C./min, and reacted for 7 hours to obtain a silicone bactericide.

The aforementioned silicone bactericide was uniformly coated on one surface of the 3 #glass by a roller coating equipment to form a bactericide layer having a thickness of 50 µm. The bactericide layer could not exhibit appearance spraying problems such as orange peel, wave pattern, and spots.

The 3 #glass was baked at a temperature of 270° C. for 13 minutes to obtain a bactericidal glass.

COMPARATIVE EXAMPLE 1

In comparative example 1, the silicone quaternary ammonium salt bactericidal solution was a silicone quaternary ammonium salt antibacterial agent DC-5700, which is a commercially available product produced by Dow Corning Corporation. The silicone quaternary ammonium salt antibacterial agent DC-5700 was uniformly coated on one surface of the 1 #glass by a roller coating equipment to form a bactericide layer having a thickness of 50 µm. The bactericide layer could not exhibit appearance spraying problems such as orange peel, wave pattern, and spots.

The 1 #glass was baked at a temperature of 260° C. for 13 minutes to obtain a bactericidal glass.

The bactericidal glasses prepared in examples 1 to 6 and comparative example 1 were subjected to an antibacterial performance test. According to the PRC Building Materials Industry Standard JC/T 1054-2007, the antibacterial performances of the bactericidal glasses were tested. The test indicators were MIC (minimal inhibitory concentration) and 24 h bactericidal rate. The antibacterial performance was evaluated according to the calculated antibacterial rate, and the results were shown in Table 1. The test strains were bacteria: *Acinetobacter baumannii* (ATCC 11038), *Klebsiella pneumoniae* (ATCC 4352), *Pseudomonas aeruginosa* (ATCC 9027), *Escherichia coli* (ATCC 25922), *Staphylococcus aureus* (ATCC 6538), *Streptococcus hemolyticus* (ATCC 19615). The control sample in Table 1 was an ordinary soda-lime glass.

TABLE 1

| | Item | *Acinetobacter baumannii* | *Klebsiella pneumoniae* | *Pseudomonas aeruginosa* | *Escherichia coli* | *Staphylococcus aureus* | *Streptococcus hemolyticus* |
|---|---|---|---|---|---|---|---|
| Example 1 | 24 hours average number of bacteria recovered of control sample (cfu/piece) | $3.2 \times 10^6$ | $3.8 \times 10^6$ | $4.8 \times 10^6$ | $2.6 \times 10^6$ | $3.7 \times 10^6$ | $1.3 \times 10^5$ |
| | 24 hours average number of bacteria recovered of bactericidal glass (cfu/piece) | 2400 | <20 | 100 | <20 | 1000 | <20 |
| | Antibacterial rate (%) | 99.92 | >99.99 | 99.99 | >99.99 | 99.97 | >99.99 |
| Example 2 | 24 hours average number of bacteria recovered of control sample (cfu/piece) | $3.1 \times 10^6$ | $3.9 \times 10^6$ | $4.6 \times 10^6$ | $2.6 \times 10^6$ | $3.5 \times 10^6$ | $1.3 \times 10^5$ |
| | 24 hours average number of bacteria recovered of bactericidal glass (cfu/piece) | 1800 | <20 | 90 | <20 | 1100 | <20 |
| | Antibacterial rate (%) | 99.94 | >99.99 | 99.99 | >99.99 | 99.97 | >99.99 |
| Example 3 | 24 hours average number of bacteria recovered of control sample (cfu/piece) | $3.2 \times 10^6$ | $3.6 \times 10^6$ | $4.5 \times 10^6$ | $2.7 \times 10^6$ | $3.7 \times 10^6$ | $1.1 \times 10^5$ |
| | 24 hours average number of bacteria recovered of bactericidal glass (cfu/piece) | 1600 | <20 | 80 | <20 | 1000 | <20 |
| | Antibacterial rate (%) | 99.95 | >99.99 | 99.99 | >99.99 | 99.97 | >99.99 |

TABLE 1-continued

| Item | | Acinetobacter baumannii | Klebsiella pneumoniae | Pseudomonas aeruginosa | Escherichia coli | Staphylococcus aureus | Streptococcus hemolyticus |
|---|---|---|---|---|---|---|---|
| Example 4 | 24 hours average number of bacteria recovered of control sample (cfu/piece) | $3.0 \times 10^6$ | $3.8 \times 10^6$ | $4.8 \times 10^6$ | $2.5 \times 10^6$ | $3.5 \times 10^6$ | $1.2 \times 10^5$ |
| | 24 hours average number of bacteria recovered of bactericidal glass (cfu/piece) | 1900 | <20 | 60 | <20 | 900 | <20 |
| | Antibacterial rate (%) | 99.94 | >99.99 | 99.99 | >99.99 | 99.97 | >99.99 |
| Example 5 | 24 hours average number of bacteria recovered of control sample (cfu/piece) | $3.1 \times 10^6$ | $3.8 \times 10^6$ | $4.7 \times 10^6$ | $2.5 \times 10^6$ | $3.6 \times 10^6$ | $1.2 \times 10^5$ |
| | 24 hours average number of bacteria recovered of bactericidal glass (cfu/piece) | 1100 | <20 | 40 | <20 | 460 | <20 |
| | Antibacterial rate (%) | 99.96 | >99.99 | 99.99 | >99.99 | 99.99 | >99.99 |
| Example 6 | 24 hours average number of bacteria recovered of control sample (cfu/piece) | $3.3 \times 10^6$ | $3.7 \times 10^6$ | $4.6 \times 10^6$ | $2.6 \times 10^6$ | $3.6 \times 10^6$ | $1.3 \times 10^5$ |
| | 24 hours average number of bacteria recovered of bactericidal glass (cfu/piece) | 1400 | <20 | 100 | <20 | 800 | <20 |
| | Antibacterial rate (%) | 99.96 | >99.99 | 99.99 | >99.99 | 99.98 | >99.99 |
| Comparative Example 1 | 24 hours average number of bacteria recovered of control sample (cfu/piece) | $3.1 \times 10^6$ | $3.9 \times 10^6$ | $4.6 \times 10^6$ | $2.5 \times 10^6$ | $3.7 \times 10^6$ | $1.2 \times 10^5$ |
| | 24 hours average number of bacteria recovered of bactericidal glass (cfu/piece) | $2.4 \times 10^5$ | $1.5 \times 10^4$ | $3.2 \times 10^5$ | 2000 | $5.9 \times 10^4$ | $7.3 \times 10^4$ |
| | Antibacterial rate (%) | 92.26 | 99.62 | 93.04 | 99.92 | 98.40 | 39.17 |

The bactericidal glasses prepared in examples 1 to 6 and comparative example 1 were subjected to a durability test. The results were shown in Table 2.

The durability tests include wear resistance test, acid resistance test, alkali resistance test, disinfectant resistance performance test, solvent resistance performance test, boiling water resistance performance test, and UV resistance performance test. According to the PRC Building Materials Industry Standard JC/T 1054-2007, the antibacterial performances of the bactericidal glasses were tested. The test indicators were MIC (minimal inhibitory concentration) and 24 h bactericidal rate. The antibacterial performance was evaluated according to the calculated antibacterial rate. The test strain was *Escherichia coli* (ATCC 25922). The control sample in Table 2 was an ordinary high alumina glass. Table 3 shows the changes of the visible light transmittance of samples made of bactericidal glasses prepared in examples 1 to 6 and comparative example 1.

The wear resistance was measured according to the method specified in GB/T 30984.1. In other words, samples made of the bactericidal glasses prepared in examples 1 to 6 and comparative example 1 were used to measure the changes of the visible light transmittance before and after the wear resistance by using a spectrophotometer conformance to GB/T 2680. Then the samples were fixed on a test platform, and the wear resistance test was performed according to the specified method using the equipment that satisfied the requirements of GB/T 30984.1. When the test was completed, the samples were rinsed thoroughly with deionized water and absolute ethanol, and were placed in an oven at a temperature of 110° C. for 15 minutes. The bactericidal performance was measured after cooling to room temperature.

The acid resistance was measured according to the method specified in GB/T 30984.1. In other words, samples were made of the bactericidal glasses prepared in examples 1 to 6 and comparative example 1, and then the samples were immersed in a 1 mol/L hydrochloric acid solution at a temperature of 23° C. for 24 hours. When the test was completed, the samples were rinsed thoroughly with deionized water and absolute ethanol, and were placed in an oven at a temperature of 110° C. for 15 minutes. The bactericidal performance was measured after cooling to room temperature.

The alkali resistance was measured according to the method specified in GB/T 30984.1. In other words, samples were made of the bactericidal glasses prepared in examples 1 to 6 and comparative example 1, and then the samples were immersed in an ammonia water having a pH of 10 at a temperature of 23° C. for 24 h. After immersion was completed, the samples were rinsed thoroughly with deionized water and absolute ethanol, and were placed in an oven at a temperature of 110° C. for 15 minutes. The bactericidal performance was measured after cooling to room temperature.

Mensuration of disinfectant resistance performance: samples were made of the bactericidal glasses prepared in examples 1 to 6 and comparative example 1. Then, the commodity bromogeramine (benzalkonium bromide content of 27 g/L) was diluted with deionized water in a volume ratio of 1:15, and then the samples were immersed in the bromogeramine diluent at a temperature of 23° C. for 24 h. After immersion was completed, the samples were rinsed thoroughly with deionized water and absolute ethanol, and were placed in an oven at a temperature of 110° C. for 15 minutes. The bactericidal performance was measured after cooling to room temperature.

Mensuration of solvent resistance performance: samples were made of the bactericidal glasses prepared in examples 1 to 6 and comparative example 1, and then the samples were immersed in a 75% (mass percentage) ethanol solution at a temperature of 23° C. for 24 h. After immersion was completed, the samples were rinsed thoroughly with deionized water and absolute ethanol, and were placed in an oven at a temperature of 110° C. for 15 minutes. The bactericidal performance was measured after cooling to room temperature.

Mensuration of boiling water resistance performance: samples were made of the bactericidal glasses prepared in examples 1 to 6 and comparative example 1, and then the samples were immersed in boiling deionized water and boiled for 1 hour. After boiling, the samples were rinsed thoroughly with deionized water and absolute ethanol, and were placed in an oven at a temperature of 110° C. for 15 minutes. The bactericidal performance was measured after cooling to room temperature.

Mensuration of UV resistance performance: samples were made of the bactericidal glasses prepared in examples 1 to 6 and comparative example 1, and then the mensuration was performed in accordance with the provisions of GB/T 16259. The UV resistance time was 250 hours and the cumulative total radiation energy was equal to or more than 750 MJ/m$^2$. After the test was completed, the samples were rinsed thoroughly with deionized water and absolute ethanol, and were placed in an oven at a temperature of 110° C. for 15 minutes. The bactericidal performance was measured after cooling to room temperature.

TABLE 2

| | Item | Wear resistance test (wool pad for 1000 times) | Acid resistance test (1M HCl, 4 h) | Alkali resistance test (pH = 10 ammonia water, 24 h) | Disinfectant resistance test (bromo geramine, 24 h) | Solvent resistance test (75% alcohol, 24 h) | Boiling water resistance test (boiled for 1 h) | UV resistance (15 kWh/m$^2$, irradiation for 250 h) |
|---|---|---|---|---|---|---|---|---|
| Example 1 | 24 hours average number of bacteria recovered of control sample (cfu/piece) | $3.9 \times 10^6$ | $3.9 \times 10^6$ | $3.9 \times 10^6$ | $3.9 \times 10^6$ | $3.9 \times 10^6$ | $3.9 \times 10^6$ | $2.7 \times 10^6$ |

TABLE 2-continued

| Item | | Wear resistance test (wool pad for 1000 times) | Acid resistance test (1M HCl, 4 h) | Alkali resistance test (pH = 10 ammonia water, 24 h) | Disinfectant resistance test (bromo geramine, 24 h) | Solvent resistance test (75% alcohol, 24 h) | Boiling water resistance test (boiled for 1 h) | UV resistance (15 kWh/m$^2$, irradiation for 250 h) |
|---|---|---|---|---|---|---|---|---|
| | 24 hours average number of bacteria recovered of bactericidal glass (cfu/piece) | <20 | 120 | 1200 | 500 | 1500 | 1800 | 40 |
| | Antibacterial rate (%) | >99.99 | 99.99 | 99.97 | 99.98 | 99.96 | 99.95 | 99.99 |
| Example 2 | 24 hours average number of bacteria recovered of control sample (cfu/piece) | $3.9 \times 10^6$ | $3.9 \times 10^6$ | $3.9 \times 10^6$ | $3.9 \times 10^6$ | $3.9 \times 10^6$ | $3.9 \times 10^6$ | $2.7 \times 10^6$ |
| | 24 hours average number of bacteria recovered of bactericidal glass (cfu/piece) | <20 | 100 | 1000 | 800 | 1800 | 1600 | 40 |
| | Antibacterial rate (%) | >99.99 | 99.99 | 99.97 | 99.98 | 99.95 | 99.96 | 99.99 |
| Example 3 | 24 hours average number of bacteria recovered of control sample (cfu/piece) | $3.9 \times 10^6$ | $3.9 \times 10^6$ | $3.9 \times 10^6$ | $3.9 \times 10^6$ | $3.9 \times 10^6$ | $3.9 \times 10^6$ | $2.7 \times 10^6$ |
| | 24 hours average number of bacteria recovered of bactericidal glass (cfu/piece) | <20 | 50 | 1200 | 800 | 1600 | 1800 | 40 |
| | Antibacterial rate (%) | >99.99 | 99.99 | 99.98 | 99.98 | 99.96 | 99.97 | 99.99 |
| Example 4 | 24 hours average number of bacteria recovered of control sample (cfu/piece) | $3.9 \times 10^6$ | $3.9 \times 10^6$ | $3.9 \times 10^6$ | $3.9 \times 10^6$ | $3.9 \times 10^6$ | $3.9 \times 10^6$ | $2.7 \times 10^6$ |
| | 24 hours average number of bacteria recovered of bactericidal glass (cfu/piece) | 40 | 40 | 1100 | 800 | 1200 | 1700 | 40 |
| | Antibacterial rate (%) | 99.99 | 99.99 | 99.97 | 99.98 | 99.97 | 99.96 | 99.99 |
| Example 5 | 24 hours average number of bacteria recovered of control sample (cfu/piece) | $3.9 \times 10^6$ | $3.9 \times 10^6$ | $3.9 \times 10^6$ | $3.9 \times 10^6$ | $3.9 \times 10^6$ | $3.9 \times 10^6$ | $2.7 \times 10^6$ |

TABLE 2-continued

| | Item | Wear resistance test (wool pad for 1000 times) | Acid resistance test (1M HCl, 4 h) | Alkali resistance test (pH = 10 ammonia water, 24 h) | Disinfectant resistance test (bromo geramine, 24 h) | Solvent resistance test (75% alcohol, 24 h) | Boiling water resistance test (boiled for 1 h) | UV resistance (15 kWh/m$^2$, irradiation for 250 h) |
|---|---|---|---|---|---|---|---|---|
| | 24 hours average number of bacteria recovered of bactericidal glass (cfu/piece) | <20 | 20 | 840 | 300 | 1000 | 1300 | 40 |
| | Antibacterial rate (%) | >99.99 | 99.99 | 99.98 | 99.99 | 99.97 | 99.97 | 99.99 |
| Example 6 | 24 hours average number of bacteria recovered of control sample (cfu/piece) | $3.9 \times 10^6$ | $3.9 \times 10^6$ | $3.9 \times 10^6$ | $3.9 \times 10^6$ | $3.9 \times 10^6$ | $3.9 \times 10^6$ | $2.7 \times 10^6$ |
| | 24 hours average number of bacteria recovered of bactericidal glass (cfu/piece) | <20 | 40 | 1000 | 420 | 1100 | 1600 | 50 |
| | Antibacterial rate (%) | >99.99 | 99.99 | 99.97 | 99.99 | 99.97 | 99.97 | 99.99 |
| Comparative Example 1 | 24 hours average number of bacteria recovered of control sample (cfu/piece) | $3.9 \times 10^6$ | $3.9 \times 10^6$ | $3.9 \times 10^6$ | $3.9 \times 10^6$ | $3.9 \times 10^6$ | $3.9 \times 10^6$ | $2.7 \times 10^6$ |
| | 24 hours average number of bacteria recovered of bactericidal glass (cfu/piece) | $2.7 \times 10^6$ | $1.3 \times 10^6$ | $1.1 \times 10^6$ | $4.5 \times 10^5$ | $3.0 \times 10^6$ | $1.5 \times 10^6$ | $1.6 \times 10^6$ |
| | Antibacterial rate (%) | 30.77 | 66.67 | 71.79 | 88.46 | 23.08 | 61.54 | 40.74 |

TABLE 3

| | Item | Wear resistance test (wool pad for 1000 times) | Acid resistance test (1M HCl, 4 h) | Alkali resistance test (pH = 10 ammonia water, 24 h) | Disinfectant resistance test (bromo geramine, 24 h) | Solvent resistance test (75% alcohol, 24 h) | Boiling water resistance test (boiled for 1 h) | UV resistance (15 kWh/m$^2$, irradiation for 250 h) |
|---|---|---|---|---|---|---|---|---|
| Example 1 | Visible light transmittance before test (%) | 87.81 | 87.95 | 87.84 | 87.89 | 87.91 | 87.80 | 87.54 |
| | Visible light transmittance after test (%) | 87.66 | 87.61 | 87.57 | 87.55 | 87.64 | 87.26 | 87.33 |
| | Changes of the visible light transmittance (%) | 0.15 | 0.34 | 0.27 | 0.34 | 0.27 | 0.54 | 0.21 |
| Example 2 | Visible light transmittance before test (%) | 87.78 | 87.90 | 87.93 | 87.90 | 87.95 | 87.78 | 87.61 |

TABLE 3-continued

| Item | | Wear resistance test (wool pad for 1000 times) | Acid resistance test (1M HCl, 4 h) | Alkali resistance test (pH = 10 ammonia water, 24 h) | Disinfectant resistance test (bromo geramine, 24 h) | Solvent resistance test (75% alcohol, 24 h) | Boiling water resistance test (boiled for 1 h) | UV resistance (15 kWh/m$^2$, irradiation for 250 h) |
|---|---|---|---|---|---|---|---|---|
| | Visible light transmittance after test (%) | 87.74 | 87.67 | 87.51 | 87.58 | 87.56 | 87.34 | 87.27 |
| | Changes of the visible light transmittance (%) | 0.04 | 0.23 | 0.42 | 0.32 | 0.39 | 0.44 | 0.34 |
| Example 3 | Visible light transmittance before test (%) | 87.83 | 87.96 | 87.98 | 87.87 | 87.92 | 87.76 | 87.89 |
| | Visible light transmittance after test (%) | 87.69 | 87.46 | 87.67 | 87.61 | 87.41 | 87.29 | 87.53 |
| | Changes of the visible light transmittance (%) | 0.14 | 0.50 | 0.31 | 0.26 | 0.51 | 0.47 | 0.36 |
| Example 4 | Visible light transmittance before test (%) | 87.67 | 87.97 | 87.88 | 87.89 | 87.96 | 87.69 | 87.73 |
| | Visible light transmittance after test (%) | 87.33 | 87.52 | 87.59 | 87.68 | 87.49 | 87.35 | 87.27 |
| | Changes of the visible light transmittance (%) | 0.34 | 0.45 | 0.29 | 0.21 | 0.47 | 0.34 | 0.46 |
| Example 5 | Visible light transmittance before test (%) | 87.76 | 87.91 | 87.80 | 87.94 | 88.03 | 87.85 | 87.68 |
| | Visible light transmittance after test (%) | 87.73 | 87.84 | 87.72 | 87.70 | 87.78 | 87.48 | 87.43 |
| | Changes of the visible light transmittance (%) | 0.03 | 0.07 | 0.08 | 0.24 | 0.25 | 0.37 | 0.25 |
| Example 6 | Visible light transmittance before test (%) | 87.71 | 87.95 | 87.94 | 87.91 | 87.98 | 87.79 | 87.72 |
| | Visible light transmittance after test (%) | 87.92 | 88.02 | 87.84 | 87.63 | 87.52 | 87.41 | 87.37 |
| | Changes of the visible light transmittance (%) | 0.21 | 0.07 | 0.10 | 0.28 | 0.46 | 0.38 | 0.35 |
| Comparative Example 1 | Visible light transmittance before test (%) | 87.81 | 87.94 | 87.91 | 87.94 | 87.88 | 87.65 | 87.59 |
| | Visible light transmittance after test (%) | 89.35 | 89.58 | 88.97 | 88.91 | 89.22 | 89.15 | 89.71 |
| | Changes of the visible light transmittance (%) | 1.54 | 1.64 | 1.06 | 0.97 | 1.34 | 1.5 | 2.12 |

The bactericidal glasses prepared in examples 1 to 6 and comparative example 1 were subjected to a weather resistance test.

The weather resistance tests include humidity freeze resistance performance test and damp heat resistance performance test. According to the PRC Building Materials Industry Standard JC/T 1054-2007, the antibacterial performances of the bactericidal glasses were tested. The test indicators were MIC (minimal inhibitory concentration) and 24 h bactericidal rate. The antibacterial performance was evaluated according to the calculated antibacterial rate. The test strain was Escherichia coli (ATCC 25922). The control sample in Table 4 was an ordinary high alumina glass.

The damp heat resistance was measured according to the method specified in JC/T 1054-2007. In other words, samples were made of the bactericidal glasses prepared in examples 1 to 6 and comparative example 1, and then the samples were vertically placed in a constant temperature and humidity chamber. The relative humidity in the constant temperature and humidity chamber was equal to or more than 95%, the temperature was controlled at 58° C., and the immersion time was 1000 hours. After immersion was completed, the samples were rinsed thoroughly with deionized water and absolute ethanol, and were placed in an oven at a temperature of 110° C. for 15 minutes. The bactericidal performance was measured after cooling to room temperature.

The humidity freeze resistance was measured according to the method specified in GB/T 30984.1-2015. In other words, samples were made of the bactericidal glasses prepared in examples 1 to 6 and comparative example 1. A temperature sensor was put on the front or rear surface of the middle portion of samples, and then the samples were loaded in a climate chamber under room temperature. The temperature sensor was connected to a temperature monitor, and then the climate chamber was closed. The sample was subjected to a humidity freeze test at temperatures of 85° C. and -40° C. having a humidity of 85% for 10 cycles. After the test was completed, the samples were rinsed thoroughly with deionized water and absolute ethanol, and were placed in an oven at a temperature of 110° C. for 15 minutes. The bactericidal performance was measured after cooling to room temperature.

TABLE 4

| | Item | Damp heat resistance test (58° C., 95% RH, 1000 h) | Humidity freeze resistance test (−40° C./+85° C., 85% RH, 10 cycles) |
|---|---|---|---|
| Example 1 | 24 hours average number of bacteria recovered of control sample (cfu/piece) | $2.7 \times 10^6$ | $2.7 \times 10^6$ |
| | 24 hours average number of bacteria recovered of bactericidal glass (cfu/piece) | 3500 | 1600 |
| | Antibacterial rate (%) | 99.87 | 99.94 |
| Example 2 | 24 hours average number of bacteria recovered of control sample (cfu/piece) | $2.7 \times 10^6$ | $2.7 \times 10^6$ |
| | 24 hours average number of bacteria recovered of bactericidal glass (cfu/piece) | 3000 | 1400 |
| | Antibacterial rate (%) | 99.89 | 99.95 |
| Example 3 | 24 hours average number of bacteria recovered of control sample (cfu/piece) | $2.7 \times 10^6$ | $2.7 \times 10^6$ |
| | 24 hours average number of bacteria recovered of bactericidal glass (cfu/piece) | 2800 | 1300 |
| | Antibacterial rate (%) | 99.89 | 99.95 |
| Example 4 | 24 hours average number of bacteria recovered of control sample (cfu/piece) | $2.7 \times 10^6$ | $2.7 \times 10^6$ |
| | 24 hours average number of bacteria recovered of bactericidal glass (cfu/piece) | 2900 | 1500 |
| | Antibacterial rate (%) | 99.89 | 99.94 |
| Example 5 | 24 hours average number of bacteria recovered of control sample (cfu/piece) | $2.7 \times 10^6$ | $2.7 \times 10^6$ |
| | 24 hours average number of bacteria recovered of bactericidal glass (cfu/piece) | 2700 | 1100 |
| | Antibacterial rate (%) | 99.90 | 99.96 |
| Example 6 | 24 hours average number of bacteria recovered of control sample (cfu/piece) | $2.7 \times 10^6$ | $2.7 \times 10^6$ |
| | 24 hours average number of bacteria recovered of bactericidal glass (cfu/piece) | 2800 | 1200 |
| | Antibacterial rate (%) | 99.89 | 99.96 |

TABLE 4-continued

| Item | | Damp heat resistance test (58° C., 95% RH, 1000 h) | Humidity freeze resistance test (−40° C./+85° C., 85% RH, 10 cycles) |
|---|---|---|---|
| Comparative Example 1 | 24 hours average number of bacteria recovered of control sample (cfu/piece) | $2.7 \times 10^6$ | $2.7 \times 10^6$ |
| | 24 hours average number of bacteria recovered of bactericidal glass (cfu/piece) | $9.2 \times 10^5$ | $1.0 \times 10^6$ |
| | Antibacterial rate (%) | 65.93 | 62.96 |

It can be seen from Table 1 to Table 4 that, the bactericidal glasses according to examples 1 to 6 have an excellent antibacterial performance, wear resistance performance, acid resistance performance, alkali resistance performance, disinfectant resistance performance, solvent resistance performance, boiling water resistance performance, UV resistance performance, and weather resistance performance. In addition, the bactericidal glass has less effect on the transmission of light of the glass.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A method of preparing a bactericidal glass, comprising the following steps of:
coating a silicone bactericide on a glass surface, wherein the silicone bactericide is obtained by reacting an organosilicone bactericidal solution, comprising: by weight percentage,
30% to 65% of organosilicone quaternary ammonium salt;
10% to 40% of tetraethyl orthosilicate;
10% to 40% of organosilicone containing double bond;
5% to 20% of organosilicone containing epoxy group;
5% to 20% of methyltrimethoxysilane; and
0.1% to 3% of organic tin catalyst;
wherein the organosilicone quaternary ammonium salt is at least one selected from the group consisting of methyldiethoxysilane ammonium chloride, N,N-dimethyl-N-octadecylaminopropyltrimethoxysilane ammonium chloride, (trimethoxysilylpropyl)octadecyldimethyl ammonium chloride, and 3-(trimethoxysilyl)propyldimethyldodecyl ammonium chloride at a temperature of 40° C. to 80° C. for 1 hour to 8 hours; and
performing a baking treatment to the silicone bactericide coated on the glass surface to cure the silicone bactericide, thus obtaining the bactericidal glass.

2. The method of preparing the bactericidal glass according to claim 1, wherein the organosilicone containing double bond is at least one selected from the group consisting of vinyltrimethoxysilane and vinyltriethoxysilane.

3. The method of preparing the bactericidal glass according to claim 1, wherein the organosilicone containing epoxy group is at least one selected from the group consisting of γ-(2, 3-epoxypropoxy)propyltrimethoxysilane, 3-(2, 3-epoxypropoxy)propyltriethoxysilane, and 3-(2, 3-epoxypropoxy)propylmethyldiethoxysilane.

4. The method of preparing the bactericidal glass according to claim 1, wherein the organic tin catalyst is at least one selected from the group consisting of dibutyltin diacetate, dibutyltin dilaurate, stannous octoate, and dibutylbis(dodecylthio)tin.

5. The method of preparing the bactericidal glass according to claim 1, wherein a temperature of the baking treatment ranges from 260° C. to 300° C., and a duration of the baking treatment is 10 minutes to 15 minutes.

* * * * *